Dec. 20, 1927.                                                          1,653,459
                            G. H. HAINES
              CONCENTRATED CRACKED CORN AND MEAL MILL
                     Filed June 29, 1923          2 Sheets-Sheet 1
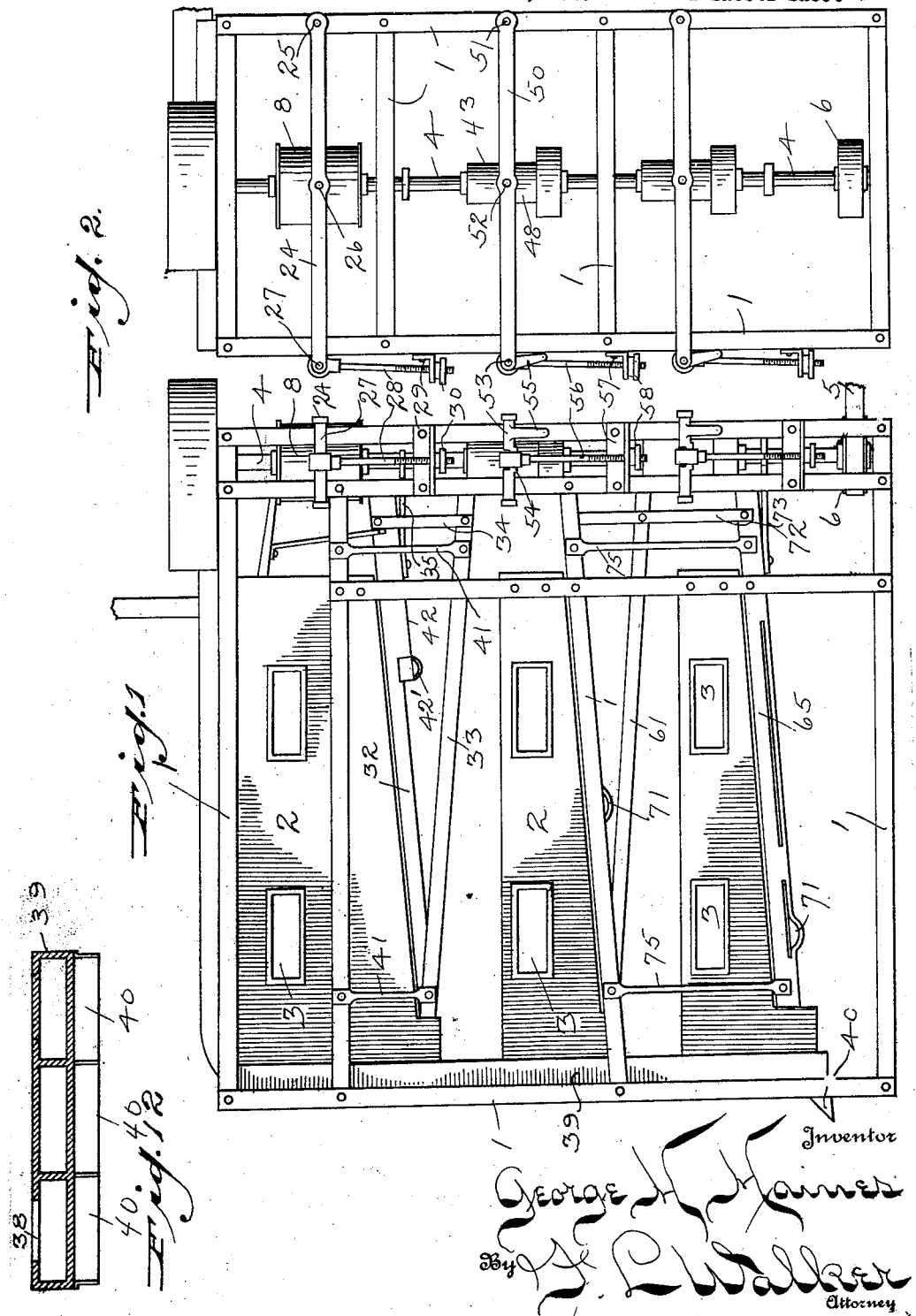

Dec. 20, 1927.  
G. H. HAINES  
1,653,459  
CONCENTRATED CRACKED CORN AND MEAL MILL  
Filed June 29, 1923 2 Sheets-Sheet 2
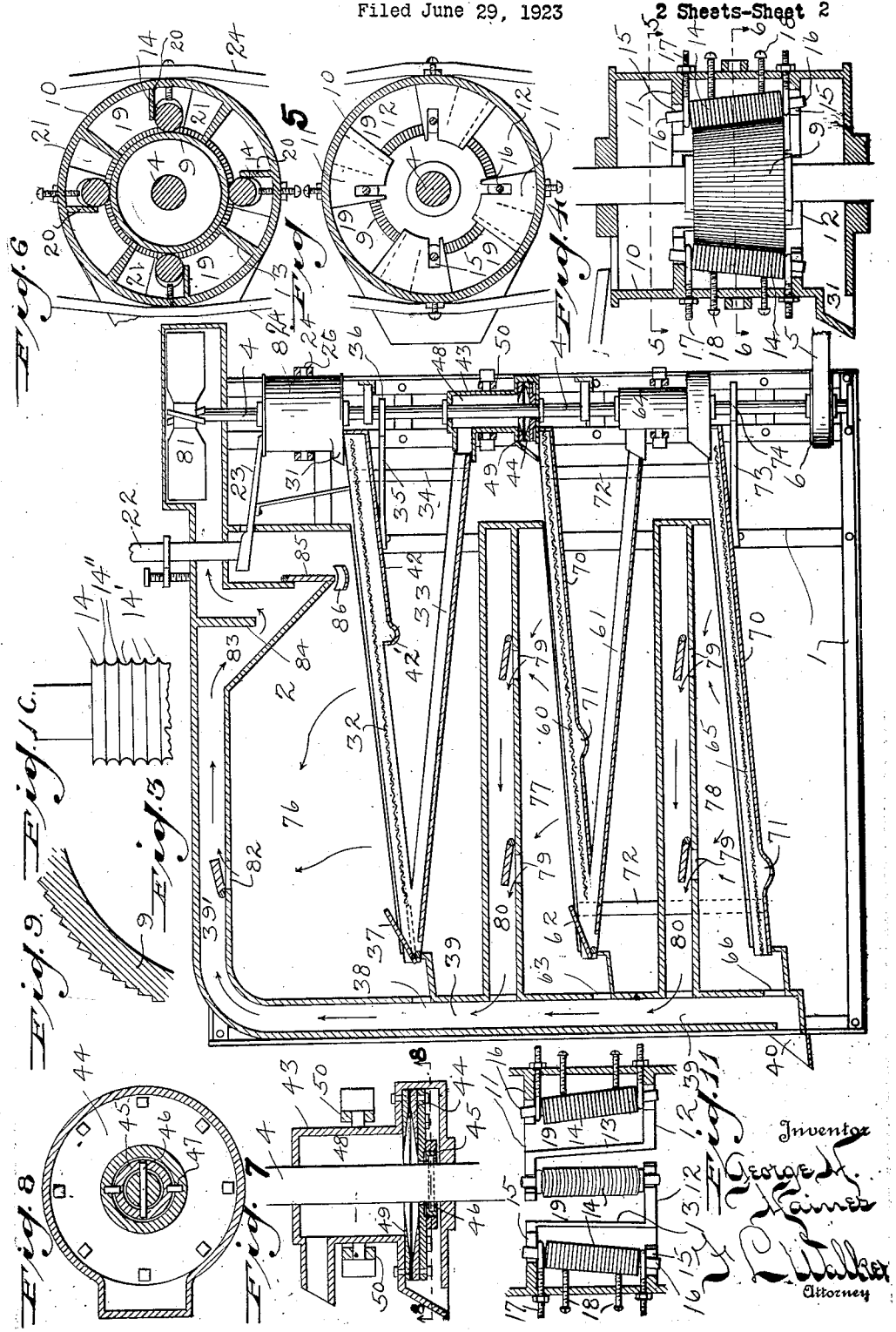

Patented Dec. 20, 1927.

1,653,459

UNITED STATES PATENT OFFICE.

GEORGE HERBERT HAINES, OF SPRING VALLEY, OHIO, ASSIGNOR, BY DIRECT AND MESNE ASSIGNMENTS, OF ONE-HALF TO WILLIAM R. HIATT, OF SPRING VALLEY, OHIO, AND ONE-HALF TO CHARLES Q. HILDEBRANT, OF WILMINGTON, OHIO.

CONCENTRATED CRACKED CORN AND MEAL MILL.

Application filed June 29, 1923. Serial No. 648,419.

My invention relates to grinding mills for grinding cereals and particularly to a mill for cracking corn and pulverizing the product into meal of varying degrees of fineness.

In the embodiment illustrated in the drawing, the mill as a whole embodies a succession of grinders intermediate which the material passes over vibratory screens from one grinder to another, the chaff and dust being exhausted from the product intermediate each grinding operation by a suction fan or other blower means.

During such screening or separating operation intermediate the successive grinding operations, the finally reduced portions or meal resulting from each grinding are separated and discharged from the mill, while the more coarse portion of the product is conducted to the succeeding grinder. Means is provided, however, for discharging the product at any point in the cycle of grinding operation, that is to say, the entire product may be discharged as it leaves any one of the succeeding grinders.

The primary grinder or cracking mill, consists of a tapered corrugated cone, co-acting with a series of cracking bars, set parallel with the cone at spaced intervals, but transversely corrugated, the cone and cracking bars being relatively adustable and the bars being further revolubly adjustable to present new or sharp cracking faces, as the different faces become worn or dull. The remaining grinders are attrition mills of the disc type. In the present instance, the several mills are mounted upon and operated from a common shaft. Each grinder, however, is adjustable independent of the remaining grinder of the series to vary the degree of fineness of the product.

The object of the invention is to simplify the structure as well as the means and mode of operation of such cereal grinding mills, whereby they will not only be cheapened in construction, but will be more efficient in use, positive in operation, uniform in action, easily operated and unlikely to get out of repair.

A further object of the invention is to provide improved means for cracking corn or other cereal and to thereafter reduce the cracked kernal to meal by successive regrinding operation.

A further object of the invention is to provide improved cleaning and separating means for treating the product intermediate successive grindings.

With the above primary and other incidental objects in view as will more fully appear in the specification, the invention consists of the features of construction, the parts and combinations thereof, and the mode of operation of their equivalents as hereinafter described and set forth in the claims.

Referring to the drawing, Fig. 1 is a side elevation of the assembled mill. Fig. 2 is an end view from the right of Fig. 1. Fig. 3 is a vertical sectional view, of the assembled grinding mill. Fig. 4 is a vertical sectional view of the primary grinder or cracking mill. Fig. 5 is a top plan view of the cracking mill on line 5—5 of Fig. 4. Fig. 6 is a transverse sectional view of a primary grinder or cracking mill on line 6—6 of Fig. 4. Fig. 7 is a vertical sectional view of one of the attrition or regrinding mills for retreating the cracked product discharged from the primary grinder. Fig. 8 is a bottom plan view partly in section of the regrinder or attrition mill on line 8—8 of Fig. 7. Fig. 9 is a detail sectional view of a portion of the corrugated grinding or cracking cone of the primary grinder. Fig. 10 is a detail view of a portion of one of the corrugated cracking bars.

Fig. 11 is a transverse sectional view of a portion of the grinding mill with the cone or drum removed. Fig. 12 is a sectional plan view of the down spout or discharge conduit.

Like parts are indicated by similar characters of reference throughout the several views.

In the preferred, but obviously not necessarily the only form of embodiment of the invention illustrated in the drawing, there is employed a main frame 1, supporting an exhaust housing 2, divided into a plurality of separating or suction chambers, through which the successive sieves extend. These chambers are provided with observation openings or windows 3. Mounted on suitable bearings in the main frame 1, and in spaced relation with one end of the exhaust or separator housing 2 is the vertical mill shaft 4, driven by a belt 5, passing over a suitable pulley 6 and actuated from any suitable source of power. The shaft 4 is common to the succession of grinders. Mounted at the upper end of such main shaft 4 is the primary grinder 8. This grinder consists of the tapered cone or bur, fixedly secured upon the main shaft 4 and rotating therewith. Surrounding the cone is a shell or hopper 10, having inwardly projecting segmental ledges 11 and 12, located at spaced levels and offset or alternating with each other. That is to say, the segmental ledges 11, of the upper series are out of registry with the segmental ledges 12 of the lower series. The adjacent edges of the upper and lower ledges are interconnected by vertical walls 13. Mounted intermediate the vertical walls 13, with their upper and lower ends adjustably engaged in the upper and lower segmental ledges, 11 and 12, are a plurality of cracking bars 14. These bars 14 are of roller like form, but do not function as rollers. The bars 14 are cylindrical and are peripherally corrugated, being provided with either parallel or helical semi-circular grooves 14′, forming comparatively sharp intermediate ridges 14″. The cracking bars 14 are inclined to the vertical in substantially parallel relation with the periphery of the bur or corrugated cone 9. The cracking cone 9 is corrugated longitudinally. Thus the corrugations of the cracking bar 14 and those of the cone are at right angles or perpendicular one to the other. The peripheral corrugations of the cone are quite abrupt on one side, that is, in the direction of rotation, and are inclined rearwardly, relative to the direction of rotation, thus affording a substantially saw tooth formation as shown in detail in Fig. 9. The cracking bars 14 are adjustable, not only in relation with the cone, but also revolubly to present different portions of their cylindrical periphery in proximity to the corrugated surface of the cone. This enables the cracking mill to be adjusted from time to time, as the operating faces of the bars 14 become worn or dull. By a partial rotation of such bars, the operating surface may be reduced, by presenting an unworn or sharp corrugated face of the bar, toward the cone. Any suitable means may be employed for adjusting and holding the bars 14 in their adjusted position. In the present instance, the segmental ledges 11 and 12 have been shown slotted at 15 to receive the terminal stems 16 of the bar 14. Eye bolts 17 are provided engaging such terminal stem and extending radially through the walls of the hopper or shell 10. Intermediate the eye bolts 17, are set screws 18, mounted in the wall of the hopper or shell, and bearing against the cracking bars 14 in opposition to the pull of the eye bolts 17 to rigidly and fixedly maintain the bars in adjusted position. By this construction there is formed a series of pockets or dependent chambers 19 intermediate the sector shaped ledges 11 to receive the uncracked cereal to be operated upon. The lowermost series of sector shaped ledges 12, form the bottoms of these pockets or dependent chambers while the vertical walls 13 form one side thereof, the opposite side of which is formed by the cracking bar 14. Ribs or spacers 20, close the intervening space between the outer side of the cracking bars 14 and the wall of the shell or hopper 10. Intermediate these pockets or dependent chambers are discharge spaces 21, opening downwardly intermediate the lower series of sector shaped ledges 12.

The corn or other cereal to be operated upon is discharged through a spout 22 and a chute 23, into the hopper or shell 10, where it is deposited in the dependent pocket or chambers intermediate the vertical partitions 13 and the cracking bars 14. As the corrugated cone rotates the kernels are carried between the corrugated or notched periphery of the cone and the corrugated cracking bars 14, where they are crushed and broken, and are discharged through the downwardly opening spaces 21, into the bottom of the hopper 10. The only exit from the pocket 20 through which the grain may escape is intermediate the revolving cone 9, and the stationary cracking bars 14, the extent of such exit passage or the proximity of the cone and cracking bars one to the other determines the degree of fineness of the product. To regulate the operation of this primary cracker, the hopper or shell 10 is mounted for limited reciprocatory movement upon the main shaft 4, in such way that it may be raised and lowered in relation with the cone. To this end the hopper or shell 10 is carried upon a pair of substantially parallel levers or arms 24, pivoted at 25 to the frame and engaging with lateral trunnions 26 upon the hopper or shell 10. At their free ends, these levers or arms are interconnected. The tie rod 27 carries a screw threaded adjusting rod 28 extending through an angle bar bracket 29 upon the main frame and carrying a stop nut or hand wheel 30 screw threaded upon the rod 28 which limits the upward movement of the levers 24 carrying the hopper or shell 10. By releasing the stop nut or hand wheel 30 the pressure of the material within the primary grinder or crusher will tend to force the crusher bar 14 away from the cone 9 thereby permitting the material to pass between the crushing bar and cone in larger pieces. The material deposited in the bottom of the hopper or shell 10 through the discharge openings 21 passes through the outlet 31 onto a vibratory screen 32. This screen 32 comprises the upper extension of a V-shaped frame the lower portion of which comprises a reversely directed downwardly inclined chute 33 leading to the next grinder of the series. The screen 32 and chute 33 are interconnected directly one to the other at one end so that the material passing over the screen 32 is discharged into the upper end of the inclined chute 33. At their separated ends the screen 32 and chute 33 are rigidly connected one with the other by intervening struts or standards 34. The V-shaped structure comprising the screen and chute is vibrated as a whole by a reciprocatory link 35 pivotally connected to the under side of the screen section and engaging an eccentric 36 upon the main shaft 4. Thus as the shaft is rotated the screen and chute are reciprocated to and fro in a substantially horizontal direction thus insuring the continuous movement of the material over the screen 32 and down the chute 33. At the junction of the screen 32 and chute 33 there is provided a gate 37 which when raised as shown in solid lines in Fig. 3 permits the passage of the material from the screen to the chute. When however the gate 37 is lowered to the dotted line position the chute 33 is closed against the entrance of the material and such material is discharged off the lower end of the screen 32 over such gate and through an outlet 38 into a down spout or conduit 39 leading to the discharge outlet 40 of the machine.

While the V-shaped structure comprising the screen and chute may be suspended on flexible hangers or on swinging links the preferable construction is to mount this vibratory structure upon spring arms 41 shown in Fig. 1. These spring arms may be of metal but because of the tendency to crystallization and breakage, it has been found in practice that such spring arms of flexible wood possessing the necessary resiliency are to be preferred. These arms 41 are fixedly or rigidly attached to the main frame 1 at one end and also fixedly secured to the vibratory structure at their lower end. By this means the movement of the screen and chute structure is against the tension of these spring arms 41 in both directions. By such construction lost motion is avoided and a quick active movement of the structure is insured which facilitates the movement of the material over the screen and down the chute. Located beneath the screen 32 in such vibratory frame is a bottom 42 which extends throughout a portion of the length of the screen 32 to receive the fine material and meal which may result from the initial crushing or cracking. This bottom 42 terminates in a transverse gutter or channel 42' through which the screenings are discharged laterally from the machine. The remaining coarse material passing over the screen is discharged into the chute 32 providing the gate 37 is raised and from such chute 32 passing into the first regrinding or attrition mill 43. This grinder or mill 43 is also mounted upon the main shaft 4 and comprises a grinding disc 44 secured to and rotating with the main shaft 4. This disc 44 is preferably flexibly mounted for limited tilting movement by means of a gimbal ring 45. The ring 45 is of slightly greater interior diameter than the diameter of the shaft 4 to enable its tilting movement to inclined planes in relation with the ends of the shaft. The ring 45 is pivoted to the shaft by a transverse trunnion pin 46. The grinding disc 44 is in turn pivoted to the ring 45 upon trunnion studs 47 arranged at right angles to the trunnion pin 46 as shown in Fig. 8. Such mounting allows the grinding disc 44 to yield slightly to the vertical and assume an inclined relationship with the axis of the shaft to accomodate an accumulation of material. The disc 44 is inclosed within a hopper or housing 48 mounted for limited reciprocatory movement axially upon the shaft 4. This housing or hopper 48 carries at its lower end a complimentary disc 49 co-operating with the rotating disc 44 to reduce the material passing there between. Like the cracker or primary grinder 8 the housing or hopper 48 of the grinder 43 is mounted upon levers or arms 50 pivoted at 51 to the main frame and engaging trunnions 52 upon the hopper or housing 48. These arms or levers 50 are interconnected at their free ends by a tie rod 53 having therein an eccentric portion or crank 54. The crank rod 53 is provided with a hand lever or rock arm 55 by which such connecting rod may be oscillated. Engaging the eccentric portion or crank 54 is a dependent screw threaded adjusting rod 56 passing through an angle iron bracket 57 and carrying a stop nut or wheel 58 similar to the adjusting device 30 of the primary grinder. The stop nut 37 limits the upper influence of the accumulation of material between the discs 44 and 49. However this limiting adjustment may be instantly released independent of the stop 57 by rotating the crank rod connecting the supporting levers or arms 50 by means of its handle or rock arm 55. This rock arm 55 throws to a position slightly beyond the dead center so that it will normally hold its position of adjustment. However in emergency or in event of any foreign material becoming lodged between the driving disc the rock arm or handle 55 may be instantly reversed thereby reversing the eccentric connection with the adjusting link or rod 55 and so relieve the pressure upon the disc.

From the attrition mill 43 the material is discharged upon a vibratory screen 60 which like the screen 32 is connected at its lower end with the upper end of a reversely directed inclined chute 61. A gate 62 is provided at the juncture of the screen 60 and chute 61 which when lowered directs the material passing over the screen 60 through an outlet opening 63 into the down spout 39 and to the final discharge outlet 40. When the gate 62 is raised the material passes off the screen 60 into the upper end of a chute 61 and thence down such chute to a second attrition or regrinding mill 64. This mill 64 is a duplication of the grinder 43 heretofore described. The regrinder 64 is tied upon adjustable arms of levers in the same manner as the grinder 43 and is controlled and operated as before described. For these reasons the detailed description will not be repeated but it is to be understood that the description applying to grinder 43 applies equally to grinder 64. From the grinder 64 the material is discharged into the downwardly inclined screen 65 which leads to an outlet opening 66 at the lower end of the down spout 39 and contiguous to the main outlet opening 40. Collecting bottoms 70 are provided beneath the screens 60 and 65 for collecting the meal and screenings which pass through the respective screens 60 and 65. These bottoms or collecting boards 70 are provided with transverse channels or gutters 71 by which the screenings are discharged laterally from the machine. The V structure comprising the screen 50 and reverse chute 61 is rigidly connected with the final screen 65 by struts or standards 72 whereby the two screens 60 and 65 and intermediate chute 61 become a unitary structure which is vibrated as a whole. Vibratory motion is transmitted by means of the link 73 pivoted to the under side of the bottom of the screen 65 and engaging an eccentric 74 upon the drive shaft 4. This vibratory structure like the one above is preferably, though not necessarily, supported upon flexible spring arms 75 fixedly secured to the main frame 1 and to the supported structure. These arms like the arms 41 are preferably though not necessarily of wood, although suspension cables or swinging links might be employed.

For the purpose of removing dust and chaff and to thoroughly ventilate and aerate the apparatus there is provided above each of the screens 32, 60 and 65 a suction chamber or exhaust compartment 76, 77, and 78 respectively. The exhaust chambers 77 and 78 communicate through valve openings 79 with the exhaust conduits 80, which communicate at one end with the down spout 39. The spout 39 extends upwardly and laterally over the primary exhaust chamber 76 to an exhaust fan 81, mounted upon the upper end of the main shaft 4. The primary exhaust chamber 76 communicates with the lateral extension 39' of the spout 39, through the valved opening 82. A baffle chamber 83 is provided within which extends a dependent baffle 84, for arresting chaff and heavier particles of dust which may be withdrawn from the various exhaust chambers, such heavy particles being deposited in the lower portion of the baffle chamber 83. This chamber is provided with a flap door, or closure 85, which is opened when an accumulation of chaff and refuse is collected within the chamber 83 to deposit such refuse in the discharge conduit or channel 86, leading laterally out of the apparatus.

It is obvious that the apparatus may be extended to include any number of regrinders or attrition mills or one or more of such mills may be omitted from the disclosure of the drawings. Likewise without omitting such mills, by closing the gate 37, only the primary grinder or cracker will be actively employed, and the coarse material will be discharged directly from the apparatus. However, by leaving the gate 37 open and closing the second gate 62, the coarse material will be reworked but once and will be discharged thence from the apparatus without passing through the second regrinder 64. However, by leaving both gates 37 and 62 elevated, the material will be reworked or reground twice, thus insuring reduction into the desired degree of fineness. However, intermediate each grinding or reworking operation, the fine material or meal is sifted out during the passage over the vibratory screen and only the coarse material is passed through the succeeding regrinder. Likewise during each screening and rescreening operation, the material is subjected to aeration and ventilation and all dust and chaff is removed by suction.

It will be obvious that the apparatus is designed to afford a wide range of adjustment and variation of the ultimate product.

The eccentrics 36 and 74 are reversely positioned upon the main shaft 4. This arrangement effects the respective V-shaped screen and chute structures simultaneously in opposite directions, and balances one structure against the other to insure uniformity of operation and equalize the strains upon the main frame.

The initial portion of the screen 32 above the bottom 42 is somewhat more coarse than the lower portion of the screen. The meal and fine products incident to the cracking operation are deposited through such initial portion upon the bottom 42 and discharged from the machine. The remaining coarser portions continue over the finer continuation of the screen without sifting through and are discharged either into the chute beneath or into the down spout 39 according to the position of the control gate. The second screen of the series is somewhat finer than the initial section of the primary screen and the succeeding screen is of still finer mesh. Thus each sifting operation after the regrinding operations, separates the more finely ground meal. The down spout or discharge conduit 39 is preferably though not necessarily divided by partitions into separate channels each having a separate outlet for the different screens as shown in Fig. 12. This enables the once cracked cereal passing over the primary screen 32 or reground material from the secondary screen to be discharged from the machine without being intermixed with finer product which may cling or be lodged in the spout or chute 39 from previous operations.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

While the corrugations of the tapered grinding member of the cracking device, or primary grinder, have been shown as longitudinally disposed, they are preferably slightly inclined or helical. In practice they are given a slight lead of approximately one half inch at the base in advance of the same corrugation at the top of the cone, i. e. a lead of approximately one to eight. The auxiliary grinders, mentioned as attrition mills are preferably though not necessarily provided with cut or corrugated plates affording somewhat of a shearing action although true attrition plates may be employed.

Having thus described my invention, I claim:

1. In a grinding mill, a main frame, a main drive shaft mounted in said frame, a plurality of grinders to which said shaft is common, conduits leading from one grinder to another for conducting the output of one grinder into the succeeding grinder, a discharge conduit common to all of the intergrinder conduits, and control devices for diverting the material from the intergrinder conduits into the discharge conduit to by-pass succeeding grinders of the plurality, said intergrinder conduits including screen sections and means for vibrating said screen sections to effect the deposit of fine material intermediate each grinding operation.

2. In a grinding mill, a main frame, a main drive shaft mounted in the frame, a plurality of grinders, to which the shaft is common, material chutes leading from one grinder to another, control gates for said material chutes, enabling the discharge of the material without the necessity of passing thru the remaining grinder, screen sections in said chutes for separating finely reduced portions of the material passing thereover, and means operatively connected with said common grinder shaft for vibrating the screen sections.

3. In a grinding mill, a main frame, a main drive shaft mounted in the frame, a plurality of grinders to which the shaft is common, material chutes leading from one grinder to another, by which the discharge of one grinder is received by the succeeding grinder, a by-pass conduit, and gates controlling said chutes by which the material passing there through may be diverted from the succeeding grinder thru said by-pass conduit.

4. In a grinding mill, a plurality of grinder units located in spaced relation one above another, a vertically disposed drive shaft common to the plurality of grinding units, a plurality of inclined discharge passages leading from the grinding units, there being one discharge passage for each unit, and a series of reversely inclined discharge passages one leading from the outlet end of each passage of the first series to the succeeding grinding unit, an outlet conduit common to all the discharge passages of the first series, and adjustable gate means for diverting the material passing through the passages of the first series either into said outlet conduit, or into the corresponding oppositely inclined passage of the second series leading to the succeeding grinder unit, at the will of the operator.

5. In a grinding mill, a plurality of grinding units, inclined discharge passages for the material operated upon leading from each grinding unit, reversely inclined discharge passages leading from the lower ends of the first mentioned inclined passages to the succeeding grinding units of the series, and control gates at the discharge ends of the first mentioned passages by the adjustment of which the material may be directed through the succeeding passages to the next grinders of the series or discharged out of the mill without passing through said succeeding passages and grinders.

6. In a grinding mill, a plurality of grinders, an inclined screen leading from the uppermost of said grinders, a reversely inclined chute leading from the lower end of the screen to the succeeding grinder, the screen and chute being fixedly interconnected one with the other and jointly movable relative to the grinders, and means for vibrating said screen and chute.

7. In a grinding mill, a succession of grinder units and a series of vibratory screens arranged in alternating intercommunicating relation whereby the material is discharged from the grinders, on to said screen and redischarged therefrom into the succeeding grinders of the series, means for transmitting to said screens a reciprocatory movement, and spring arms independently supporting the succeeding screens against the inherent resiliency of which the screens are vibrated in alternating directions, and actuating means for simultaneously moving diferet screens of the series in opposite directions.

8. In a grinding mill, the combination with a plurality of grinding units of a series of supply chutes for material to be ground intermediate the succession of grinding units and inclined downwardly toward said grinding units and discharging thereinto, material received by said supply chutes from the preceding grinding units of the plurality, means for simultaneously vibrating said chutes, in opposite directions and flexible supporting arms for said chutes against the tension of which the chutes are vibrated.

9. In a grinding mill, a plurality of grinding units, discharge passages for the material operated upon leading from each of the units, a separate exhaust chamber overhanging each of the passages, suction means, a suction conduit having branches communicating with the respective exhaust chambers pertaining to the respective discharge passages, and valves controlling the exit openings from the chambers to said conduit branches, by which one or more of the chambers may be connected with the suction means to the exclusion of others.

10. In a grinding mill, grinding means, a succession of passages for the material operated upon, an exhaust conduit interposed between succeeding passages, a suction means common to all the exhaust conduits, and control valves regulating the exhaustion through the respective conduits by which the material passing through the different passages may be aspirated to varying extent.

11. In a grinding mill, a shell, a rotary grinding element located within the shell in spaced relation with the walls thereof and rotating on a vertical axis, a series of separated recesses formed intermediate the rotary grinding element and the shell, said recesses opening alternately upwardly and downwardly, a series of cracking bars stationarily mounted in the shell in parallel relation with the peripheral face of the grinding element, said bars separating the upwardly opening recesses from the downwardly opening recesses, and permitting the passage of material to be ground from one recess to the other only through the intervening space between the grinding element and said cracking bars.

12. In a grinding mill, a main shell, a rotary grinding element mounted for rotation upon a vertical axis, a plurality of stationarily mounted cracking bars being cylindrical in form and peripheral corrugated and receiving pockets for the material operated upon contiguous to said cracking bars and intermediate the grinding element and walls of the shell, from which the material passes between the grinding element and bars.

In testimony whereof, I have hereunto set my hand this 22nd day of June A. D. 1923.

GEORGE HERBERT HAINES.